United States Patent [19]
Dobeck

[11] Patent Number: 4,901,992
[45] Date of Patent: Feb. 20, 1990

[54] STOCK STOP
[75] Inventor: Nicholas J. Dobeck, Wausau, Wis.
[73] Assignee: Quantum Machine Services, Inc., Wausau, Wis.
[21] Appl. No.: 880,474
[22] Filed: Jun. 30, 1986
[51] Int. Cl.⁴ ............................................. B23Q 15/00
[52] U.S. Cl. ...................................... 269/315; 83/72; 83/247; 83/268; 83/363; 83/468; 33/556
[58] Field of Search .................... 83/71, 72, 247, 268, 83/252–254, 318, 363, 467.2, 467 A, 468; 33/172 E; 269/315, 318, 320

[56]  References Cited
U.S. PATENT DOCUMENTS

| | | | |
|---|---|---|---|
| 1,569,649 | 1/1926 | Way | 83/268 |
| 1,969,503 | 8/1934 | Eksergian | 83/251 |
| 3,163,065 | 12/1964 | Kolodgy et al. | 83/72 |
| 3,194,100 | 7/1965 | Fehlberg | 83/247 |
| 3,466,958 | 9/1969 | Munson | 83/71 |
| 3,687,178 | 8/1972 | Golick et al. | 83/468 X |
| 3,766,815 | 10/1973 | Edixhoven | 83/160 |
| 4,170,911 | 10/1979 | Ayers et al. | 83/104 |
| 4,331,050 | 5/1982 | Gergek | 83/71 |
| 4,434,693 | 3/1984 | Hosoi et al. | 83/71 |
| 4,627,321 | 12/1986 | Moore | 83/468 |

Primary Examiner—Frank T. Yost
Assistant Examiner—Eugenia A. Jones
Attorney, Agent, or Firm—Wheeler Law Firm

[57] ABSTRACT

A manual stock stop is diclosed including a track assembly and a sliding stop assembly. A cable-activated electromechanical position transducer sends an electrical signal corresponding to the position of a stop bar mounted on the top assembly to a monitor/control unit which displays the position of the stop bar. A fine adjustment mechanism in the stop assembly allows for precise positioning of the stop bar. An automatic stock stop is also disclosed including a track and sliding carriage assembly. A motorized screw mechanism mounted on the track moves a carriage a limited distance along the track. The ends of flippers mounted on the carriage can be extended beyond an edge of the carriage to actually stop the stock. A guide and a device for performing a machine operation on the stock may also be mounted on the track. A computer control unit activates and coordinates the various functions of the stock stop.

2 Claims, 3 Drawing Sheets

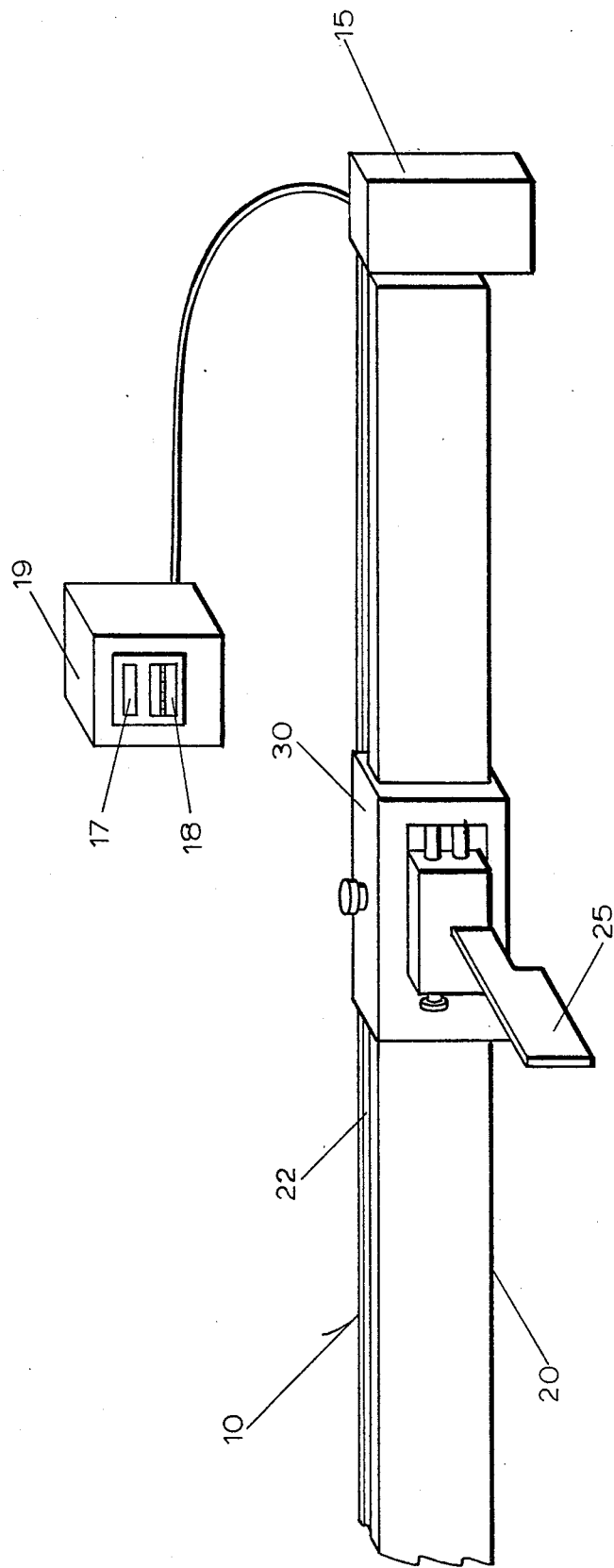

STOCK STOP

BACKGROUND OF THE INVENTION

The present invention relates to stop devices for accurately positioning bar, rod or strip stock upon which machine operations (such as cut off, drilling, bending, etc.) are to be performed. Stop devices known include those described in U.S. Pat. No. 3,877,331 (Saveliev, et al.), U.S. Pat. No. 3,466,958 (Munson), U.S. Pat. No. 3,194,100 (Fehlberg), U.S. Pat. No. 3,163,065 (Kolodgy, et al.), U.S. Pat. No. 2,618,046 (Mansell), U.S. Pat. No. 2,395,562 (Mansell), U.S. Pat. No. 1,969,503 (Eksergian), and U S. Pat. No. 1,946,926 (Barton).

Precise and reproducible positioning is of primary importance in stop devices. Reliability, speed and ease of operation as well as the versatility to accomplish a repeating, pre-set cycle of positions or an individual positioning are desirable features of such a device.

SUMMARY OF THE INVENTION

The manual stock stop of the present invention includes a track assembly along which a stop assembly can be manually slid and clamped in position. A cable-activated electromechanical position transducer generates an electrical impulse corresponding to the position of the stop assembly which is sent to a monitor/control unit which displays the location of the stop assembly. Once calibrated, a fine adjustment mechanism allows precise positioning of the stop assembly.

To calibrate the stock stop, the stop assembly is arbitrarily positioned and the desired machine operation is performed on a sample of stock. The distance from the stopped end of stock to the position at which the machine operation was performed is carefully measured, and that value is entered into the monitor/control unit. The monitor/control unit will now display the precise location of the stop assembly wherever it is moved. By releasing the clamp, the stop assembly can be moved and reclamped at approximately the desired position, and then moved to precisely the desired position by the fine-adjustment mechanism, based on the display reading of the pre-calibrated monitor/control unit.

The automatic or computerized stock stop of present invention includes a base or track upon which a carriage assembly is mounted and moved a limited distance along the track by a motorized screw mechanism. A device for performing the desired machine operation is also mounted on the base or track. Mounted on the carriage are several equally spaced moveable flippers which, when moved into their extended or vertical position, actually stop the stock. The motorized screw mechanism and flipper movements are controlled by a computer into which the desired length or lengths have been input. By extending the flipper nearest the desired length, the time required for movement of the carriage by the motorized screw mechanism is greatly reduced. The computer control unit also permits the programming and performance of a cycle or series of positions to be achieved. Pre-calibration of the control unit is as described above, except that calibration is required only as to a single stop. Distances to the other stops are programmed into the control unit, whether equal or unequal. The automatic carriage movement replaces the manual adjustment of the simpler unit These and other benefits of the present invention will be apparent to one skilled in the art from the description and drawings which follow.

DESCRIPTION OF DRAWINGS

FIG. 1 is a perspective view of the manual stock stop 2 of FIG. 3 of the present invention with the end of the track assembly cut away for convenience;

DETAILED DESCRIPTION

Figure 3:
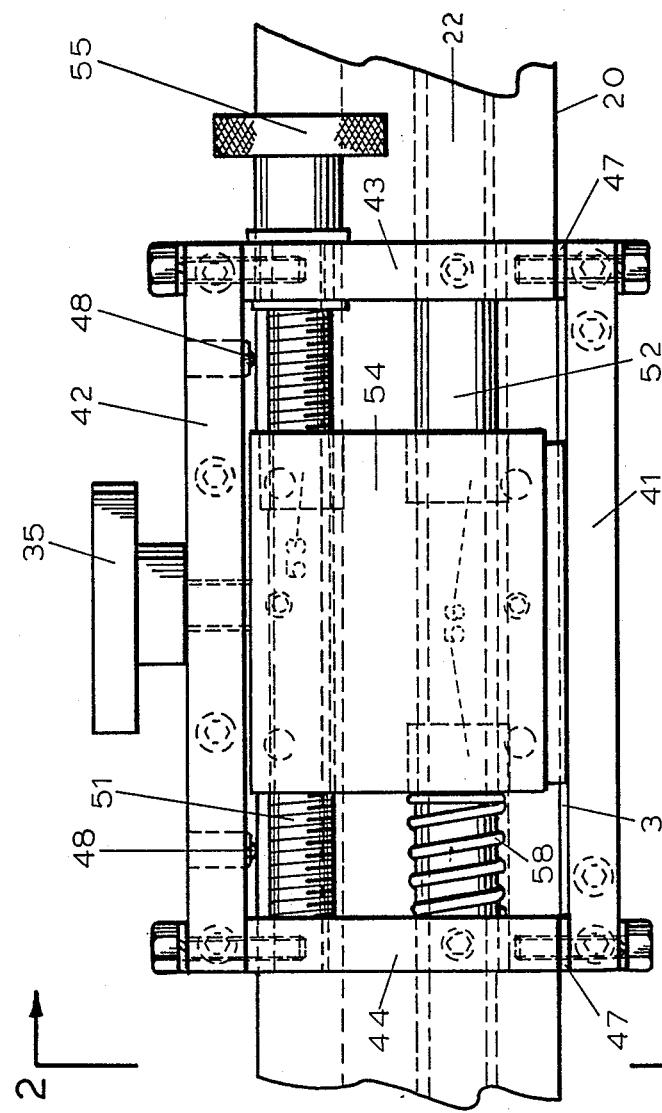
FIG. 3 is a front view of the stop assembly of the manual stock stop of present invention.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In this description and the claims that follow, the term "stock" refers to stock of any workpiece material shaped as a bar, rod, strip or the like. Additionally, throughout this description, cutting a piece of stock to a desired length will be the machine operation performed on the stock. It should be noted, however, that other machine operations such as drilling, bending, or the like are operations which may likewise be performed within the invention on stock positioned by the present invention. The words "machine operation" refer to any operation so performable.

The manual stock stop of present invention is generally denoted in the drawings by the numeral 10 and has a track assembly 20 and a stop assembly 30. An electromechanical position transducer 15 is mounted on one end of the track assembly 20. The transducer 15 produces an electrical signal corresponding to the position of the stop assembly 30 and relays that signal to the monitor/control unit 19.

The stop assembly 30 has a frame 40 whose upper rear member 45 and lower rear member 46 partially surround the track 22 of the track assembly 20. The stop assembly 30 slides along the track 22 on ball bearings 48 mounted in the bottom member 42 of the frame 40 and can be secured at any point along the track 22 by turning clamping knob 35. Spacer bars 47 create a space 47 between top member 41 of frame 40 and the track 22. Rod 52 is mounted between left side member 43 and right side member 44 of the frame 40. The fine adjustment screw 51 is also mounted between side members 43 and 44 but passes through left side member 43 and has a fine adjustment knob 55 mounted thereon outside of the frame 40. Fine adjustment screw 51 and rod 52 pass through block 54. Thread insert 53 assures that when the fine adjustment knob 55 is turned, block 54 slowly moves within the frame 40 of the stop assembly 30. Bushings 56 assure smooth movement of block 54 along rod 52. Spring 58 surrounds rod 52 between block 54 and side member 44 and applies pressure to block 54 to take up any slack in the fine adjustment screw 51. A stop or stop bar 25 is mounted on block 54 at its center, perpendicular to the track 22.

Figure 2:
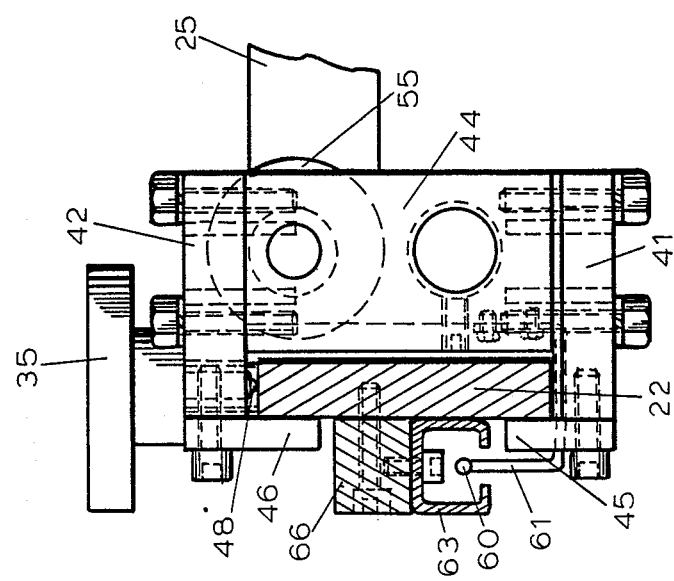
FIG. 2 is a view of the stop assembly of the manual stock stop of present invention showing a portion of the track assembly.

Mounted behind track 22 is a support bar 66 which extends the length of track 22 (see FIG. 2). Mounted on the bar 66 is a cable guard 63 which protects cable 60 and which also extends the length of track 22. Cable arm 61, which is generally U-shaped, attaches cable 60 to block 54. Cable arm 61 passes through the upper rear member 45 of the frame 40, through space 37 between the top member 41 of the frame 40 and the track 22, and is mounted to block 54 directly behind when stop bar 25 is mounted to block 54. The position of cable arm 61, therefore, directly corresponds to the position of stop bar 25. Since cable 60 activates the transducer, cable arm 61 provides the means by which the precise position of stop bar 25 is determined.

To calibrate the stock stop 10, the stop assembly 30 is secured at any position along track 22 by tightening clamping knob 35. A position near the desired length is recommended but not necessary. The stock is then cut, and the resulting length of stock is accurately measured using a vernier scale or other known means which insure a precise measurement. The precisely measured length is then entered into the monitor/control unit 19 using the keyboard 18 thereon to pre-calibrate the monitor/control unit 9 to the precise actual distance, so that the readout on the display 17 reflects the length of stock produced by having the stop bar 25 in the position selected for calibration. The stock stop 10 is now calibrated. It will be understood that the length to the surface produced by any desired machine operation may serve as a basis for pre-calibration measurement in the same way.

To cut stock to the desired length, clamping knob 35 is loosened, the stop assembly 30 is moved until the readout on the display 17 of the monitor/control unit 19 is close to the desired length, clamping knob 35 is tightened and fine adjustment knob 55 is turned until the display 17 on the monitor/control unit 19 shows the precise length desired. The calibrated monitor/control unit 19 then allows highly reproducible machine operations.

Figure 4:
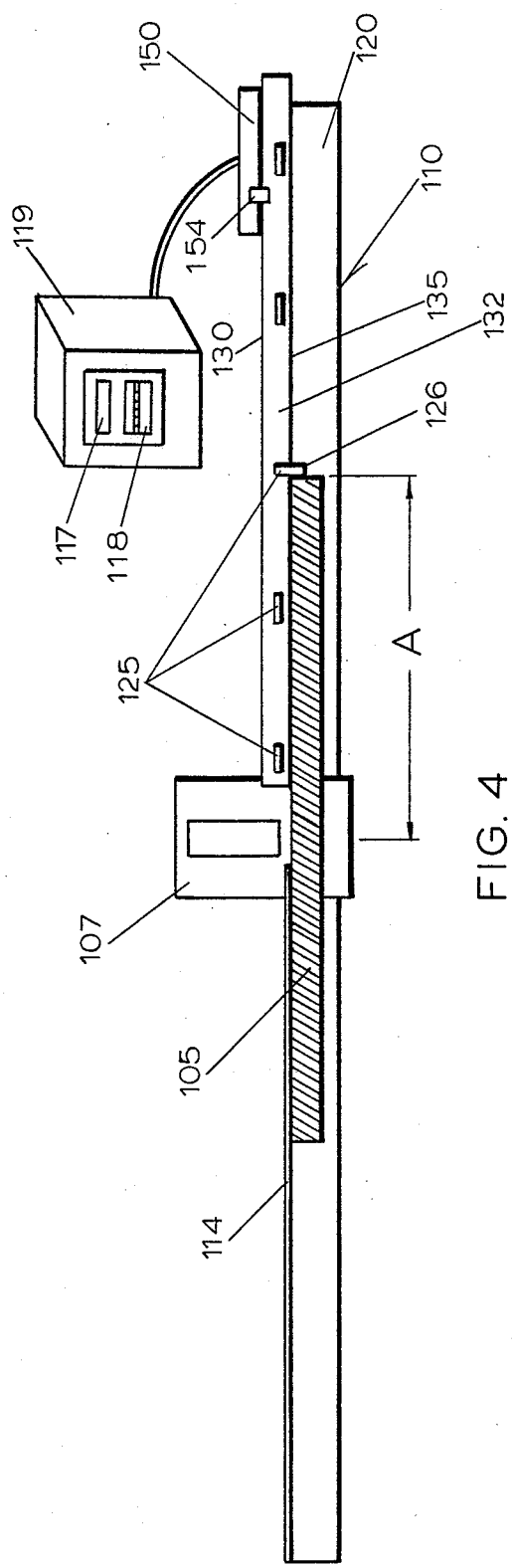
FIG. 4 is a front view of the automatic stock stop of present invention showing a piece of stock positioned for cutting to length "A"
Figure 5:
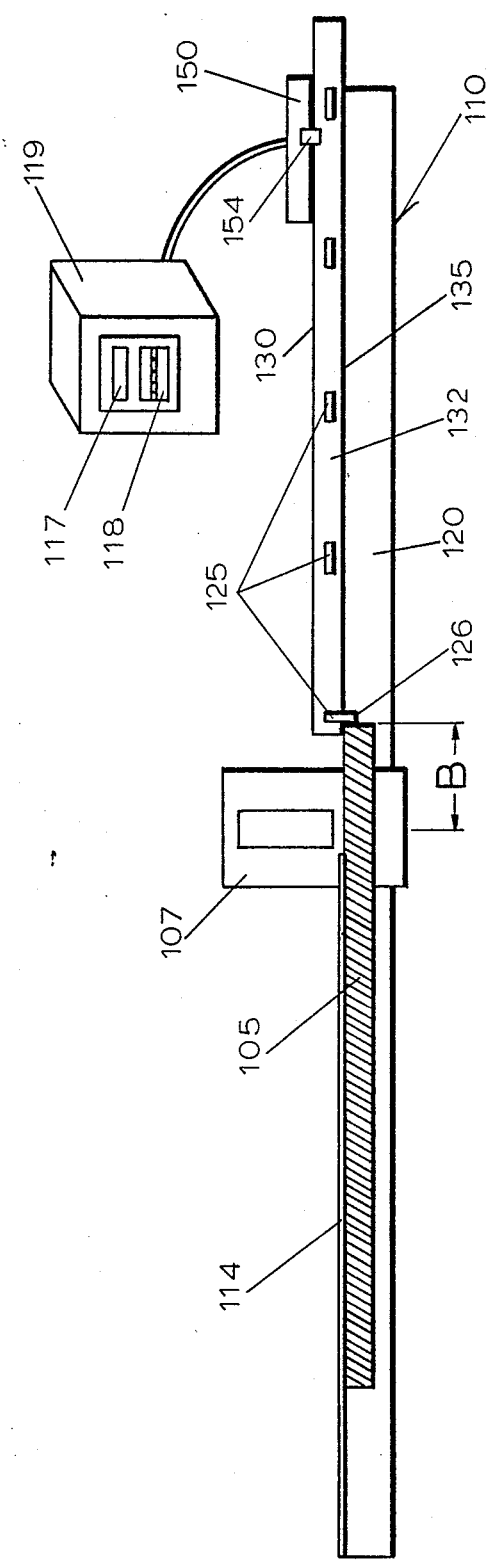
FIG. 5 is a front view of the automatic stock stop of present invention showing a piece of stock positioned for cutting to length "B".

The computerized or automatic stock stop of present invention is generally denoted by the numeral 110 and shown in FIGS. 4 and 5. The automatic stock stop 110 has a track 120 with a cutting device 107 and a motorized screw mechanism 150 mounted thereon. A carriage assembly 130 is also mounted on the track 120 on linear bearings (not shown) to allow the carriage assembly 130 to move along the track 120. A guide 114 on the track 120 is aligned with the bottom edge 135 of the carriage assembly 130 to assure proper orientation of a piece of stock 105 when manually or automatically fed into the automatic stock stop 110.

The carriage assembly 130 has an elongated carriage 132 and a number of moveable flippers 125. Each flipper 125 can be moved by a known actuating means (not shown) so that one end 126 extends below the bottom edge 135 of the carriage 132. Known sensing means transmit information as to which flipper is in operating position to the computerized control unit 119 of a known type which receives the flipper actuation data and user input as to the desired measurement from the flipper to a surface to be produced by a machine operation, derives the required carriage position, and produces an output carriage control signal to the motorized screw assembly 150 that positions the carriage 130.

The flipper 125 so extended actually stops the piece of stock 105. A schematically represented connector 154 connects the motorized screw mechanism 150 to the carriage 132 so that the screw mechanism 150 can move the carriage assembly 130 a limited distance, preferably not greater than the distance between any two adjacent flippers 125, along the track 120, under control of the computerized control unit 119.

The functions of the automatic stock stop 110 are controlled by a known computerized control unit 119 having a display 117 and data input keyboard 118. An operator inputs the desired length using the keyboard 118 thereby setting the display 117, and the computer control unit 119 outputs a signal causing an actuator (not shown) to extend end 126 of the flipper 125 nearest that length. The motorized screw mechanism 150 is then activated by an output from the computer control unit 119 to move the carriage assembly 130 so as to bring the flipper 125, whose end 126 extends below the bottom edge 135 of the carriage 132, to precisely the desired length from the surface produced by the machine operation of the tool 107 on the carriage. The computer control unit 119 then activates the tool or other cutting device 107.

If a series of lengths has been input, the computer control unit 119 then outputs a signal which retracts the flipper 125 whose end 126 was previously extended and extends the end 126 of the flipper 125 nearest the second length. The motorized screw mechanism 150 is then activated to move the carriage assembly 130 to bring the flipper 125 whose end 126 now extends below the bottom edge 135 of the carriage 132 to precisely the second desired length. The cutting device 107 is then activated. Since the change of flippers 125 is nearly instantaneous and the motorized screw mechanism 150 moves the carriage assembly 130 only a limited distance, the time between cuts is greatly reduced compared to devices having only a single stopper.

The computerized control unit, cutting device, electromechanical position transducer, monitor/control unit, flipper actuator and screw mechanism are known and are commercially available, form no part of the present invention, and are, therefore, not disclosed in detail herein. They are, however, within the skill of the art to provide in conjunction with the disclosed stop stock devices 10 and 110.

What is claimed is:

1. A device for error correcting positioning of a piece of stock upon which a machine operation is to be performed, comprising:

stock support means; adjacent track means; a stop assembly which partially surrounds and slides along said track means; a stop against which an end of a piece of stock resting on said stock support means may be positioned, said stop being mounted on said stop assembly for limited movement with said assembly such that said stop may be moved a limited distance within said stop assembly; a means for securing said stop assembly at any point along said track means; a fine adjustment mechanism within said stop assembly for moving said stop a limited distance within said stop assembly to reposition said stop after an initial operation and error measurement whereby said stop positions said piece of stock so that said machine operation is subsequently performed at a desired position along said piece of stock; means for manually activating said fine adjustment mechanism;

said fine adjustment mechanism comprising:

a block; said stop being mounted on said block and comprising a bar extending perpendicular to said block; a screw extending through said block and horizontally mounted within said stop assembly with one end of said screw extending through one side of said stop assembly; a means for receiving said screw mounted within said block such that when screw is turned, said block moves along said screw; a rod horizontally mounted within said stop assembly parallel to said screw and passing through said block; and a spring surrounding said rod between an end of said block and a side of said stop assembly such that said spring removes any slack between said screw and said receiving means.

2. A device for error correcting positioning of a piece of stock upon which a machine operation is to be performed, comprising:

stock support means; adjacent track means; a stop assembly which partially surrounds and slides along said track means; a stop against which an end of a piece of stock resting on said stock support means may be positioned, said stop being mounted on said stop assembly for limited movement with said assembly such that said stop may be moved a limited distance within said stop assembly; a means for securing said stop assembly at any point along said track means; a fine adjustment mechanism within said stop assembly for moving said stop a limited distance within said stop assembly to reposition said stop after an initial operation and error measurement whereby said stop positions said piece of stock so that said machine operation is subsequently performed at a desired position along said piece of stock; means for manually activating said fine adjustment mechanism;

an electromechanical position transducer mounted on said track means for generating an electrical impulse which corresponds to the position of said stop along said track means; a means for activating said transducer; a monitor/control unit to which said electrical impulse is sent; said monitor/control unit having a display and keyboard which allow calibration of said monitor/control unit such that said display accurately reflects the distance between said stop and the location at which said machine operation is to be performed on said piece of stock without error;

said fine adjustment mechanism further comprising:

a screw horizontally mounted within said stop assembly such that one end of said screw extends through one side of said stop assembly; a block through which said screw passes and on which said stop is mounted such that said stop extends perpendicular to said block and said track means; a means for receiving said screw mounted within said block such that when said screw is turned, said block moves along said screw; a rod horizontally mounted within said stop assembly parallel to said screw and passing through said block; and a spring surrounding said rod between an end of said block and a side of said stop assembly such that said spring removes any slack between said screw and said receiving means.

* * * * *